United States Patent
Shapiro

(10) Patent No.: US 7,337,172 B2
(45) Date of Patent: Feb. 26, 2008

(54) INTERGENERATIONAL INTERACTIVE LIFETIME JOURNALING/DIARY AND ADVICE/GUIDANCE SYSTEM

(75) Inventor: Saul Shapiro, Portland, OR (US)

(73) Assignee: Rosario Giacobbe, Desio (IT)

( * ) Notice: Subject to any disclaimer, the term of this patent is extended or adjusted under 35 U.S.C. 154(b) by 522 days.

(21) Appl. No.: 10/811,299

(22) Filed: Mar. 25, 2004

(65) Prior Publication Data
US 2005/0033735 A1 Feb. 10, 2005

Related U.S. Application Data

(60) Provisional application No. 60/457,676, filed on Mar. 25, 2003.

(51) Int. Cl.
G06F 17/30 (2006.01)
G06F 7/00 (2006.01)
(52) U.S. Cl. .............. 707/10; 707/104.1; 709/206
(58) Field of Classification Search .............. 707/10, 707/104.1; 705/14; 709/206
See application file for complete search history.

(56) References Cited

U.S. PATENT DOCUMENTS

| 5,207,580 | A | 5/1993 | Strecher | 434/238 |
|---|---|---|---|---|
| 6,006,227 | A | 12/1999 | Freeman et al. | 707/7 |
| 6,470,449 | B1 | 10/2002 | Blandford | 713/178 |
| 6,795,808 | B1 | 9/2004 | Strubbe et al. | 704/275 |
| 7,028,072 | B1 * | 4/2006 | Kliger et al. | 709/203 |
| 2002/0052768 | A1 * | 5/2002 | Walker et al. | 705/7 |
| 2002/0078070 | A1 | 6/2002 | Eshelman et al. | 707/200 |
| 2004/0177002 | A1 | 9/2004 | Abelow | 705/14 |
| 2006/0031245 | A1 * | 2/2006 | Krieglstein | 707/102 |

OTHER PUBLICATIONS

Lansdale, M. and E. Edmonds "Using Memory for Events in the Design of Personal Filing Systems", International Journal of Man-Machine Studies, vol. 36, 1992, pp. 97-126.*
Freeman, E.T. The Lifestream Software Architecture, PhD Dissertation, Yale University, May 1997.*
Blood, R. "Weblogs: A History and Perspective", downloaded from www.rebeccablood.net, Sep. 7, 2000.*
Ham, M. "A New Baby Journal", in The Journal Newsletter, vol. 2, No. 12, Dec. 2001*
Family History Products "Writing an Autobiography, Life Story or Family History the Fun, Fast and Easy Way!", downloaded from www.familyhistoryproducts.com. Feb. 10, 2002.*
Lee, J. "Recording Your Life Story", Presented at FamilyRoots 2002, Alberta Family Histories Society, Oct. 26, 2002.*
Family History Products "Write an Autobiography for Yourself or Help a Parent or Grandparent With Theirs", downloaded from www.familyhistoryproducts.com, Dec. 1, 2002.*

(Continued)

Primary Examiner—Luke S Wassum
(74) Attorney, Agent, or Firm—Drinker Biddle & Reath

(57) ABSTRACT

An interactive system provides journaling and life coaching. Storage of information, images and the like is provided. Users can request referrals to product and service vendors providing appropriate advice, goods and services as may be desired at specific stages of life. The system can be divided into life phase portions, to assist in keeping of journals or memories at specific phases of life, and to provide information and advice appropriate to experiences one encounters at those particular phases.

1 Claim, 1 Drawing Sheet

OTHER PUBLICATIONS

DavidRM Software "The Journal Makes It Easy for You to Keep a Personal Journal or Dairy!", downloaded from www.davidrm.com/thejournal, Feb. 10, 2003.*

DavidRM Software "Introduction", The Journal Newsletter, vol. 4, No. 2, Feb. 2003.*

DavidRM Software "Introduction", The Journal Newsletter, vol. 4, No. 3, Mar. 2003.*

Clark, Stephen R. "Journaling Software", in Dawning Bulb newsletter, vol. 5, Jun. 2, 2003.*

Boyter, M.R. "The MemoryGrabber™", downloaded from www.familyhistoryproducts.com, Revision 2, Feb. 2004, excerpts.*

DVO Enterprises "Personal Historian", downloaded from www.dvo.com, Jun. 28, 2007.*

Wikipedia "Online Diary", downloaded from en.wikipedia.org, Jul. 10, 2007.*

Freeman, E. and Fertig, S. Lifestream: Organizing your Electronic Life, AAAI Fall Symposium: AI Application in Knowledge Navigation and Tretrieval, Nov. 1995.

Freeman, E. and Gelernter, D. Lifestreams: A storage Model for Personal Data, SIGMOD Record, vol. 25, No. 1, 1996.

Steinberg, S.G. Lifestreams, Wired Magazine, Issue 5.02, Feb. 1997.

* cited by examiner

INTERGENERATIONAL INTERACTIVE LIFETIME JOURNALING/DIARY AND ADVICE/GUIDANCE SYSTEM

BACKGROUND OF THE INVENTION

This invention relates to journals and recording lifetime events and history.

Throughout our lives significant events, lessons, relationships, and other experiences are woven into the fabric of our lives, strand by strand. Lives pass too soon without rich and important stories, wisdom, and philosophies being passed on to children, grandchildren, and generations beyond.

Journals are often begun with the intention of continuing them for some time. Yet we can easily become frustrated with not saying what we really want to about an experience, or forgetting the details about an important lesson learned. How many times have we stared at a blank page, eager to record an event but with no clear idea of what to say? A simple blank book does not inspire one to get to the real heart of an experience. This invention accomplishes that abundantly, through the use of thousands of carefully-constructed prompts tailored to life's specific stages. Questions get the writing process flowing, and create a deep and comprehensive inter-generational record of each life and a digital archive of those objects which are important to each life interactively through the Internet.

SUMMARY OF THE INVENTION

In accordance with the invention, a system is provided to collect one's life stories as the person lives them. Through different phases of one's life, the system prompts or otherwise interactively cooperates with the person so as to assist the person in describing in the person's own words the important things of each day, creating memories of births, marriages, loss, family events, work experiences and daily life experiences, for example.

Accordingly, it is an object of the present invention to provide an improved system for interactively collecting and archiving a lifetime history which is accessible to generations to follow.

It is a further object of the present invention to furnish an improved lifetime story system to provide guidance and record events throughout a person's life and extending into future generations.

It is yet another object of the present invention to provide an improved journaling system and a device presenting publication.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
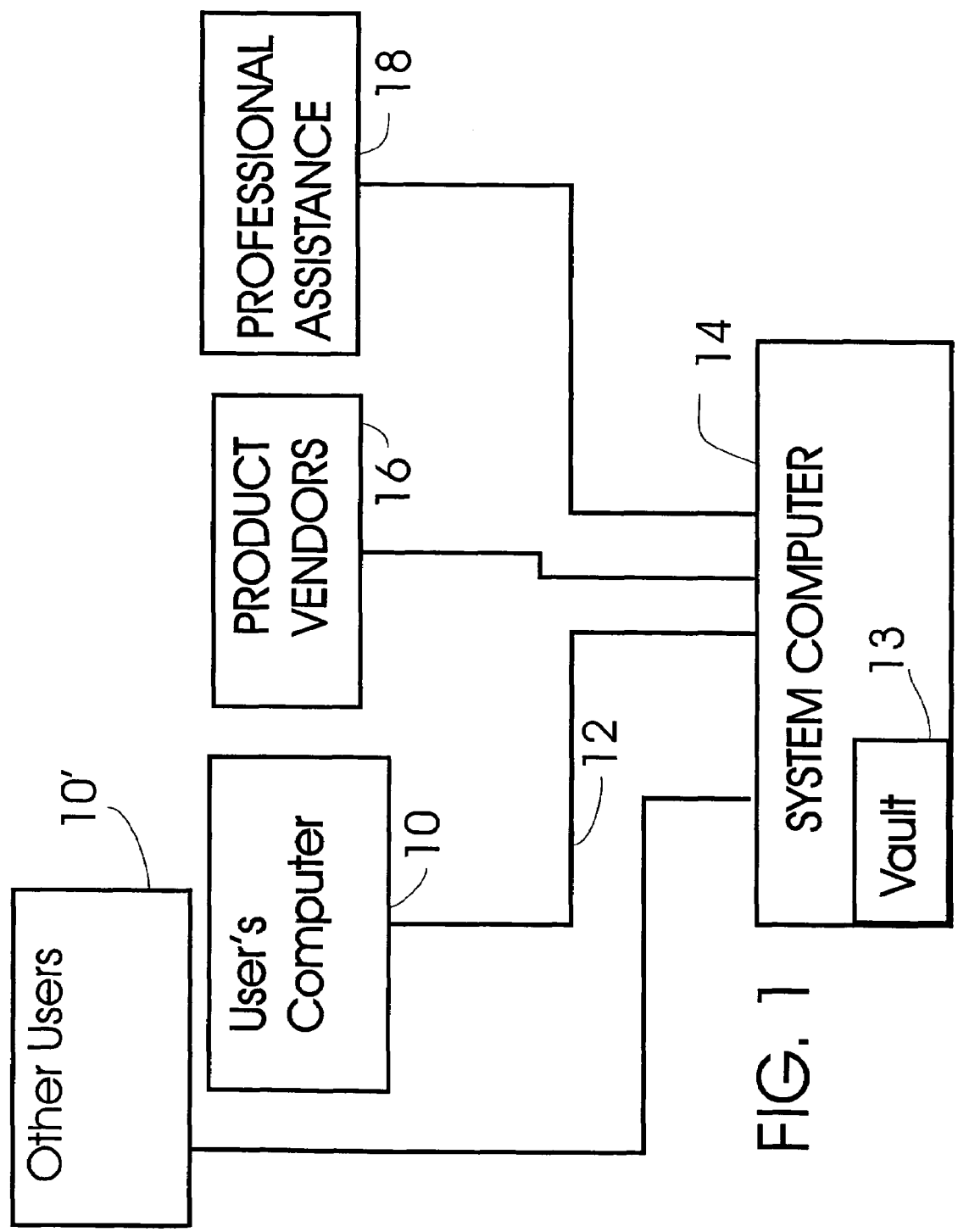
FIG. 1 is a block diagram of a system according to the present invention and related product lines.

The system according to a preferred embodiment of the present invention comprises an intergenerational lifetime interactive diary/journaling/advice book system.

Referring to FIG. 1, a block diagram of an exemplary structure of a system implementing the invention, a user's computer 10 interacts with the system computer 14, for example via the internet or other suitable communication link 12. A vault 13 may be provided on the central computer for storage of information as noted hereinbelow. One or more product vendors 16 or professional assistance providers 18 are also suitably linkable to the system computer, either by interactive communication therewith, or by entry in a database of contact information or an information library. Plural other users 10' may also suitably interact with the user 10. The system computer may be provided by an internet service provider, as an interactive web page, for example, accessed by a browser, whether operating on a computer, a phone, a pda device, or the like. The system is suitably accessible via the Internet or world wide web, for example.

In use, the system as presented to the user is structured in a manner similar to the progress of a person's life, which may be provided in plural volumes or books. Therefore, the system begins with a first volume which may be called, for example, The Great Event, presenting the beginning of a person's life.

This first volume in the series possesses a fundamental difference from other "baby books" indicative of the uniqueness the system of the present invention brings to a crowded market. The system is structured with the concept that an individual's history begins not with birth, but with conception, and that the record of a life must include the nine months of pregnancy. This first volume moves from conception through birth, following all the amazing milestones of early childhood and ends just at the very beginning of the school experience, that first big step away from home and into the big world. The first seven years of life's experiences are recorded through the use of interactive prompts that parents can respond to alone or with their child. Product sponsors may offer special discounts to users of the system, so in this first volume the new parent might find pages with coupons for diaper services, learning toys and children's furniture. The professional services links may suitably connect them to experts on breastfeeding, attachment parenting, how to deal with stubborn toddlers and whatever else the learning parent needs, just as he or she needs it, any time of the day or night. This volume may be completely self-contained, yet also completely integrated with its companion volumes, discussed hereinbelow.

Hereinbelow are lists of exemplary questions as employed in a preferred embodiment, related to pregnancy, labor and delivery, and the like.

PREGNANCY

1. I knew I was pregnant on:
2. How we found out/how I told Dad
3. First trip to OB/GYN, confirming pregnancy,
4. Whom we told, and what they said
5. I felt . . .
6. Baby's projected due date
7. Record of each OB/GYN visit
8. Pre natal weight gain chart
9. Pregnancy cravings
10. Ultrasounds (include photo/print)

11. Mom felt the first flutter of life on:
12. Mom felt the first kicks on:
13. Dad felt the first kicks on:
14. Mom felt the first hiccups on:
15. Mom first heard the baby's heartbeat on:
16. Dad first heard the baby's heartbeat on:
17. Mom first needed to wear maternity clothes on:
18. Things mom did while pregnant (working, playing, exercising, hobbies, travel, holidays)
19. Date the first "outside" person noticed Mom's pregnancy:
20. Baby's movements felt like . . .
21. Special tests Mom had, and why
22. Preparing the house for baby planning/outfitting/decorating nursery w/photo
23. How Mom and Dad prepared for birth, incl. special classes, breathing exercises, nutrition, physical exercises, books read
24. Showers/gifts
25. Describe what is happening to Mom's body (including measurements) weekly/monthly
26. Dreams during pregnancy
27. As the baby's Mother, my hopes are (perhaps written to baby as letter):
28. As the baby's Father, my hopes are (perhaps written to baby as letter):

Labor/Delivery
1. How We Want It To Be: Ask yourself . . . Where are you when contractions start? What time of day is it? What positions would you like to labor in? What position would you like to deliver in? What medications (if any) are acceptable to you? What objects do you want to make sure you have with you during labor/delivery? Who do you want to be present through labor and/or delivery? How will you get to the place you plan to give birth? What will you wear during labor and delivery? What will you eat and drink after your baby is born? How long will you stay at the place you plan to give birth? What help will you receive at home after the baby arrives?
2. Will you prepare a birth plan, so those assisting you will know exactly what you want and expect?
3. How did you spend the days just before the time came?
4. What did you do to get prepared/packed/ready to go? What special things will you take with you to enhance the birth?
5. Describe the start of labor or the trip to the hospital/birthing center
6. The labor story (how long, who was there, how Mom felt, etc.)
7. The delivery story
8. What was the hospital stay like Visitors Gifts
9. What does baby look like? Length, weight, hair, eyes, who does baby resemble?
10. When baby first saw Mom and Dad first hugs first impressions
11. First days of baby's life
12. Name of doctor or midwife
13. Baby's name and why we chose it Girls' names we liked, boys names we liked, top 5 of each What was the World Like
1. Snapshot of the world on the day of baby's birth
2. Headlines; world leaders; world stage (politics)
3. Pop Culture: sports heroes; best movies; best books; best music/performers; actors/actresses; popular TV shoes, incl. what Mother and Father watched; fashions; cars; fads.
4. Headlines
5. What things cost (benchmark items like average annual salary; minimum wage; average home price; new car; a gallon of gasoline; a few things everyone owns like TV, computer, etc.; groceries, i.e. gallon of milk/candy bar/loaf of bread/cup of coffee; postage stamp;

Baby's Firsts
1. Coming home: day/date/time, what was the weather like, what were you thinking on the car ride home, what did baby wear
2. Meeting brothers and sisters, other relatives; what they did, what baby did
3. First: smile, laugh, coo, lifted head, rolled over, found toes, played peek a boo, responded to name, slept through night, tooth, had all teeth by, sat up alone, started reaching for objects, crawled, stood up holding on to someone, stood up alone, cruised, danced, sang, ate solid food (what was it), fed self, haircut, word, started talking, walked, threw ball, baby initiated hug/kiss, first time child shows kindness/affection to a friend.
4. First outing: when and where, with whom Describe other "first" outings, i.e. first trip to park, zoo, relatives house, playgroup/playdate, party, etc.
5. First big trip in the big world: Plane, train, bus, car or boat?

Baby's Development
1. Place for weekly picture of baby and developmental update (ongoing stats)
2. Growth chart (height/weight)
3. Baby's sleep patterns at 1, 3, 6, 9, 12, 18 and 24 months Who is Baby?
1. Family tree
2. Favorites: sights and sounds, foods, songs and stories (update these each year)
3. Special toys, loveys, blankies, comforts
4. Baby's dislikes
5. "Early discoveries and bright sayings" what did baby do early and well?
6. Medical/immunization records
7. Baby's pets
8. Baby's travels Religion
1. Christening/Briss/Blessing Way describe ceremony, who attended, gifts. How will you bring up baby in your religion/belief system Birthdays
1. For each birthday who was invited/attended, themes, decorations, games played, cake, gifts received Mom and Dad
1. About Mom: I was born . . . What was happening that year . . . My own childhood favorites . . . Pets I had . . . About my family . . .
2. About Dad: I was born . . . What was happening that year . . . My own childhood favorites . . . Pets I had . . . About my family . . . Where/when/how Mom and Dad meet? Describe their first date. What did each of them do for a living at the time they met? What are their shared interests? What do they most like and love about each other?

Baby's Family
1. Collected words of wisdom from relatives a sort of time capsule to collect family wisdom and stories
2. Baby Facts to teach to new big brother or sister (how to be one)
3. Family "lingo" the special language of your family Advice/Coaching
1. Month based pregnancy groups groupings of women/men/couples due in a particular month, so that they can make the journey of pregnancy together, sharing friendship, support and information along the way
2. Mother to mother connection, both before and after birth
3. Father to father connection, both before and after birth
4. Post partum depression/experts/counseling
5. How to find childcare in your town—what options are there—what public entities are in place to help—who can provide me with background and information about providers Products/Services
1. Birth announcements
2. First year calendar
3. Scrapbooks either created/stored 100% on the web or computer, with digitized photos completely integrated to the pages; pages designed on computer to add photographic prints to; or designs printed out and glued to acid free paper and photographic prints added.

Links
1. Daily updates of your unborn baby's or born baby's development
2. Daily updates on change in mom's body
3. Mom's and baby's dietary needs and how to meet them, complete with recipes
4. Birth flower (meanings), birth stones (meanings), birth signs (reference book Our Baby Album, published by Burnes yellow book w/teddy bears/bunnies on cover
5. Freebies
6. Coupons
7. Fetal development calendar customizable to your individual baby, based on projected delivery date
8. Tooth chart (web interactive, like a chart to fill out)
9. Parental coaching/reference (i.e. How to stimulate your child's brain for maximum development
10. Best childrearing books (for example, the system advantageously includes the option to purchase these books right off the displayed page, for example, such as an Amazon books partner or the like, to provide additional revenue stream). Site could provide book rating system by subscribers to The Great Event (A-F, with space for comments)

Sponsorship Opportunities
Diapers, formula, photographic film, camera manufacturers, clothing manufacturers and stores, toy manufacturers and stores, retail stores.

Inserts
1. Adoption (as detailed in area of pre birth/preparation process as biological child section)
2. Loss of a child Here are some example prompts as employable in a preferred embodiment of the system:

The World as It Was
1. News Headlines, Political Figures, Popular Entertainers, Popular Songs, Big Names in Sports, Popular Movies, Best Selling Books, Popular TV Shows, Fashions and Fads Memorable Firsts
a. The first little smile appeared at age:
b. And the first real laugh was at age:
c. The first tine baby slept through the night was:
d. Mother was first recognized at age:
e. Dad was first recognized at age:
f. Baby discovered hands and feet on:
g. Baby discovered own voice, cooed and babbled:
h. Raised head alone and held it up on:
i. That little hand first reached for . . . at age . . .
j. Baby picked up and handled what . . . on
k. Baby kicked vigorously and tried to turn over at:
l. Baby first turned over at:
m. Baby let Mom and Dad know his or her likes and dislikes:
n. The first time baby sat up alone was at age:
o. Baby first held cup and drank:
p. Baby first held spoon and ate:
q. Baby first began to crawl at age:
r. Baby pulled self up and stood with aid of furniture:
s. Pulled self up and stood alone:
t. Baby started creeping:
u. That all important first step was taken at age:
v. The very first word spoken was . . . and it was said at age . . .
w. The time came for the first haircut at age:

Special Favorites
a. Toys, pets, stories, songs, nursery rhymes, food, games, playmates, activities, places About Me when I Was Little
b. I began to hear when I was:
c. Other people knew I could hear because:
d. The sounds I liked best:
e. These are the tastes I like, and some of the stranger things I've tried to eat:
f. This is when Mommy began feeding me, and what I like:
g. I try to touch everything. These are the things I like to touch:
h. I got into trouble touching these things:
i. During my first year the things I went to sleep with, and my favorite playthings were:
j. Here are the words I could say before I was two, and some of the things I thought about the world:

From the New Big Brother or Sister to be
1. Mom thinks our baby will come about: (write in the date)
2. What do Mom and Dad say you were like when you were a baby.
3. Mom is wishing for because:
4. Dad is wishing for because:
5. I am wishing for because:
6. This is what other people in my family said when Mom told them about our baby:
7. Boy's names I like best:
8. Girl's names I like best:
9. Girl's names Mom likes best:
10. Boy's names Mom likes best:
11. Boy's names Dad likes best:
12. Girl's names Dad likes best:

13. Girl's names other people like best:
14. Boy's names other people like best:
15. People say babies never remember what it was like living inside their Moms before they were
16. born. Do you remember?
17. What does Mom say you did when you were inside her?
18. If I could write to Baby I would say:
19. If I could talk to Baby, I might ask:
20. If Mom has our baby at home:
21. If Mom goes to the hospital:
22. When Mom and our baby come home I can help by:
23. This is what I saw at the hospital during the delivery:

Our Baby's Personality
  a. Mom says:
  b. Dad says:

A chart may suitably be provided to record the baby's tooth development. An exemplary chart is shown hereinbelow:

| | | Dates Teeth Appeared | | | |
|---|---|---|---|---|---|
| Upper | Left | Right | Lower | Left | Right |
| 1 | | | 1 | | |
| 2 | | | 2 | | |
| 3 | | | 3 | | |
| 4 | | | 4 | | |
| 5 | | | 5 | | |

Other Information in this Section May Comprise:
1. Any habits that might affect later development of teeth:
2. Record of Visits to the Dentist
3. Visits Dates
4. Dentist's Comments
5. Dates and comments about loss of teeth As indicated above, Each particular section or book may including inserts with information on particular topics, sponsorship data noting particular sponsors who have made an association with the book (which might be paid sponsors or public service sponsors), links, which will provide links to websites or other items of interest or having relation to the particular book section, products, services which would be available relevant to the particular section (e.g. diaper services or the like) and advice, support and coaching related inserts, which would have information in general about such coaching or advice, support or references to or advertising from specific coaching/advice/support providers.

At the end of the first phase of this system discussed herein above, denoted "The Great Event", a next volume may suitably be provided, representative of the next phase in the person's life, School Days.

Beginning in kindergarten, this volume suitably provides prompts that describe the complete educational experience, from finger painting and story books to the day the student throws his or her mortarboard into the air and heads out into the world to begin life as an adult. School Days is conventionally divided into three phases, including elementary school (kindergarten through sixth grade); middle school (seventh through ninth grade); and high school (tenth though twelfth grade). The School Days portion includes content designed and crafted by the very individuals it is targeted to. Content contributors in their teens and early 20s provide the ever-evolving volume with content so that it remains relevant and appropriate for its audience. Subscribers to School Days will have opportunities to assume the role of spokesperson for their own history, as well as meet others their own age, discuss pertinent information, enter contests, get help with homework, e-mail, send photos, build their own Web pages and receive offers for great deals on youth-oriented products. The utility of this book surpasses any diaries or memory books currently offered to this segment of the market, through the use of multiple media.

Presented below are exemplary prompts and pointers raised in the particular embodiment in the school days section.

School Days Book

Grades K-6th
1. Explore your own feelings about certain situations by imagining a letter asking for help, and answering the letter, advice column style.
2. School data, compiled for each year of grade school
3. Your age at the start of the school year—height and weight at beginning and end—what I wore on the first day of school—my teacher—my best friends—favorites (book, video, animal, cartoon, TV show, game, thing to wear, outdoor activity, food, color, school activity)—what I want to be when I grow up—best memory of the year—best field trip—favorite sport—things I'm good at (I feel great about myself when I . . . )—ways I'd like to improve myself
4. The best thing about being in _ grade is:
5. Each year, note some of the biggest events in the world you heard being talked about on the news and at school
6. You and popular culture (explore pets, hobbies, sports, music, movies, books, magazines, etc.)

Grades $7^{th}$-$9^{th}$
1. School data, compiled for each year of middle school/junior high
2. Your age at the start of the school year—height and weight at beginning and end my class schedule for the year—my favorite subject(s)—my favorite teacher(s)—my best friends—favorites (book, movie, music, TV show, outfit, shoes, band, food, magazine, hero, hang out, school event, hobbies, things to collect, after school activity)—what I want to be when I grow up—best memory of the year—favorite sport—things I'm good at (I feel great about myself when I . . . )—ways I'd like to improve myself. Things are really different in jr. high school because . . . The hardest thing to get used to has been . . .
3. The best thing about being in _ grade is:
4. Whom I admire most, and why
5. If I could be anyone I wanted to be, it would be . . .
6. Advice I'd give to a kid in the 1s grade
7. My best friend would describe me as . . .
8. How I've changed since starting school:
9. I like time by myself to . . .
10. Coming of age scrapbook: Ask older friends and relatives to share the piece of advice they wish they had received upon becoming a teenager
11. What makes me stand out in a crowd
12. Biggest local, national and international news stories/events of each year
13. I'd like to be better at _____. so I plan to . . .
14. You and popular culture (explore—pets, hobbies, sports, music, movies, books, magazines, etc.)
15. People know I'm not a little kid anymore
16. The greatest moment for me this year was 17. High school is coming soon for me. I am excited about that because . . . What I think high school will be like . . .

Grades 10th-12th
1. School data, compiled for each year of high school
2. Your age at the start of the school year—height and weight at beginning and end—my favorite classes—favorite teachers—hardest classes—snack—my signature—drink—my best friends—favorites (stars, world figures, heroes, food, TV show, movie, music, school activity, place to go on a date, car)—what I want to be when I grow up—best memory of the year—best school dance of the year—favorite after school activity—my biggest accomplishment of the year—things I'm good at (I feel great about myself when I . . . )—ways I'm involved in school. Things are really different in high school because . . .
3. The best thing about being in grade is:
4. Biggest local, national and international news stories/ events of each year
5. Things I'd like to change about the world
6. Whom I admire most, and why
7. If I could be anyone I wanted to be, it would be . . .
8. If I were in charge of the school, I would . . .
9. Advice I'd give to a kid in the 7th grade
10. What makes me stand out in a crowd
11. I'd like to be better at _____, so I plan to . . .
12. How high school has been different from junior high or middle schools: What is completely cool? What do I miss? What is really hard? I know next year will be better because . . .
13. Coming-of-age scrapbook: Ask older friends and relatives to share the piece of advice they wish they had received upon starting high school
14. What I like to do before school, during lunch and after school
15. School events I loved this year
16. My classes: Most challenging; most enjoyable; most flat-out fun; strangest assignment; best book I read the whole year.
17. Five years from now I hope to be . . . ten years . . . twenty years . . .
18. You and popular culture (explore pets, hobbies, sports, music, movies, books, magazines, etc.)
19. My stats as an athlete—my goals—personal bests—most memorable moment etc.
20. Great parties of the year where they were who was there what I did how I felt about it
21. School dances
22. Concerts: I went to see—I went with—the venue—we stayed out until—you wouldn't believe what happened
23. Road trips—vacations—holidays—long weekends—spring break
24. Weekends: What I like to do—I sleep until—my family and I—I hang out with my buds at—I like to shop at—favorite thing to do on a Saturday—I work at—my boss is—my co-workers are—I earn—my uniform—I work X hours a week—what I do with my money
25. Dating: Best date I've been on—worst date I've been on—dates that were just for fun—I have gone out with—I want to go out with—I fell hard for—how we met—how we got to know each other—favorite memories
26. Moments I want to hold on to: Proudest—most embarrassing—funniest—scariest—happiest—saddest—best—most unforgettable—bravest—rowdiest Prom and Graduation
1. Prom: Theme, the night, where it took place, the band, my date, how I asked him/her or how s/he asked me, dinner, how we got there, what we wore, our flowers, who we went with, what we did after, members of the court, scariest moment, what time we got home
2. Graduation: Senior trip—baccalaureate details—graduation date—where—when—theme—valedictorian—salutatorian—speakers—honors & awards—what I did—who I walked with—reception parties—my thoughts on the day
3. Coming-of-age scrapbook: Ask older friends and relatives to share the piece of advice they wish they had received upon graduating from high school. (Plastics.)
4. What I might be doing this time next year . . . What I think I will be doing in 5 years . . . 10 years . . . 20 years . . . Career goals—outlook on marriage—family plans—where I will live—car I will drive—I'd like to earn $XXX,XXX someday.

Non Grade Specific
1. Write down some things you've learned and memories you've collected from your relatives. What are some things you know about your family?
2. Adults in your life: Whom do you like to spend time with? Why? With whom do you talk most about important stuff? What do you value in your relationships with these people?
3. Feelings: One of the keys to learning more about who you are and who you want to be is listening to the clues you give yourself—the things you think about, the ways you feel. Take time to write down some of the most important things you thought about today.
4. When have you felt most . . . proud? Ashamed? Happiest? Saddest? Surprised? Etc.
5. Write your own story, an autobiography of your life so far
6. Jot down the fads and average prices of some basic necessities each year to see how the world changes economically during your school years (average annual salary; minimum wage; average home price; new car price; a gallon of gasoline; average price of a new TV, computer, a gallon of milk, candy bar, loaf of bread, cup of coffee, soda, postage stamp) (What's out—what's in—world snapshot)
7. School sports statistics
8. How do you like to look/dress? What is your style? Do you like your style, or do you wish it were different?
9. Create a ZOOM-like library of fun learning activities
10. Your friends: which friend have you known longest? Known shortest? Your funniest friend—kindest friend—friend who is most like you—friend who is most opposite of you—best advice giver—most trustworthy—wildest—craziest—smartest—most fun—most creative—most stylish—best in a crisis—friend who is most like your brother or sister.
11. What makes a good friend? How I met my friends . . . what I like about them . . . what I admire most about them . . . we are alike . . . we are different . . . things we do together . . . why we fight . . . favorite memories . . . will we be friends forever?
12. List your friend's favorite: stars, singers, song, CD, TV show, color, food, place, hobby, pets, sports, athletes, teacher, school subject, writer, animal, dessert, drink, season, game, possession, expression, store, magazine, etc.

Advice/Coaching
1. Homework help
2. Preparing for the arrival of a new baby in the family
3. Preparing for adolescence
4. Sex and development
5. Friends—how to be one, how to make them, how to keep them
6. How to make major decisions (consulting "experts" in your life, writing a list of pros and cons, researching the issues)
7. How to change bad behavior that is not working in your life
8. How do you deal with peer pressure?

Products/Services
1. Senior year memory/scrap book
2. Senior prom memory/scrap book
3. Virtual autograph book a place where friends can go and write the kind of things they might write inside the front and back cover of a yearbook Links
1. Getting involved—in your neighborhood, city, or bigger (like a park that is to littered and filthy to play in, or a neighbor that could use some help, or some need that needs filling—model after ZOOM Into Action)
2. Who are you/what's your style? (Links to pages about mapping your personality, i.e. Myers-Briggs, the Enneagram, Zodiac, Chinese Zodiac, etc.)
3. Explore your creativity
4. Learning games for all ages, preschool-12$^{th}$ graders
5. Postcards from the world of you—send a message that let's you say hard things you need to say
6. Having fun
7. Your personal address book
8. Birthdays and other important days
9. Social issues: racism, inequality, global pollution, etc.

Sponsorship Opportunities
1. Film/camera manufacturers, clothing manufactures, credit card companies, banks, other financial services, clothing retailers, all commodities considered too hip or cool for people over the age of 20 to grok Inserts
1. Teen age pregnancy
2. Loss of a sibling/death in the family
3. Loss of a friend
4. Moving away Examples of Prompts Grades K 6th
1. I was born (where), (when) . . .
2. If I could choose a nickname, I would want it to be . . .
3. My favorite number is . . .
4. My lucky number is . . .
5. What was the name if your first cat or dog?
6. What did it look like?
7. What did you call it?
8. How did you like to play with it?
9. Could it do any tricks?
10. Did you ever lose a pet?
11. If you were given a chance to write something memorable in wet cement, what would it be?
12. Do you remember the first big city you ever visited?
13. Would you rather live in a big city, a small town, or something in between? Why?
14. Have you ever had a bad cut? How did it happen? What did you have to do about it? Did it leave a scar?
15. What do you do when you get money? Do you save it or spend it? Do you have a bank account? Are you saving for something special?
16. What is your favorite thing to eat? What is your least favorite thing to eat? What are some types of food you have always wanted to try? What is something you've always wanted to learn to cook? What is your favorite flavors) of ice cream? Do you prefer to have it in a dish, on a plain cone, or on a waffle cone? Have you ever made homemade ice cream? Do you remember a special occasion when you had ice cream?
17. If you were king or queen of the whole world, what is a law that you would make right away?
18. What were your favorite Halloween costumes? Were they store bought, or did you make them? What do you think you might like to dress as in the future?
19. Are you a morning person or a night person?
20. Did you ever stay up all night? Why? Was it fun?
21. What does your room look like? Is it big, or little? Is it comfortable? Did you get to make decisions about what it looks like? What is your favorite thing about your room? What don't you like about it? What is the view outside your window?
22. If you could make a time capsule and put it away to be discovered by your grandchild, what would you put in it? It should be something(s) that are important, wonderful, and/or something that might change that child's life.
23. What is your favorite way to spend a summer day?
24. Did you ever go to summer camp? What is your favorite camp song? Camping place? Campfire story? If you were lost in the woods and it got dark, what would you do?
25. What are three things for which you feel really thankful?
26. If you could become invisible, where would you go and what would you do?
27. What are some things that really bug you?
28. What would you do if you had a magic wand?
29. What talents do you have (don't be modest!)?
30. Finish this sentence: The best thing about today is . . .
31. If you had to move and could take only three things with you, what would you take?
32. Write about a time when you felt very proud of yourself.
33. What makes you laugh?
34. If you could receive a sixth sense, what would you want it to be?
35. Share one of the happiest days of your life. Share a time in your life when you were embarrassed.
36. What do you like most about yourself?
37. What is the most sentimental possession that you have?
38. My favorite family story so far is about when . . .
39. I love the smell of/I love the feel of/I love the sound of/I love the taste of/
40. My favorite place is . . .
41. I show people I care by . . . I know people care about me because they . . .
42. My favorite movie so far is . . . because . . .
43. After school I usually . . .

44. My favorite animal is . . . because . . .
45. My favorite relative is . . . because . . .
46. My favorite babysitters . . .
47. I don't like _____ because . . .
48. I love my bike. This is what it looks like:
49. I love playing _____ with _____.
50. When I want to be alone, I . . .
51. I like the name(s) _____. I wish my name was _____ because . . .
52. The breakfast I love most is . . .
53. My favorite crayon colors are . . .
54. I think I do these things well . . .
55. When it comes to magazines, I read these every month:
56. The most important person I know is:
57. When I feel quiet, I like to . . .
58. My favorite musical instrument to listen to is . . . I play music on . . .
59. I think the best invention ever made is . . .
60. Today at school I learned . . .
61. I'm really upset. The reason is . . .
62. The scariest thing that ever happened to me is . . .
63. A hero can be a woman or man, girl or boy, or an animal. Who is a hero to me?
64. My theme song should be . . . because . . .
65. A favorite artist is . . . because . . .
66. One of the places I've been that I've really, truly loved is . . . because . . .
67. The best place I ever lived was . . . because . . . The worst place I ever lived was . . . because . . .
68. Here's a list of important turning points in my life:
69. If I were to choose one that I think altered my sense of myself, I would pick . . . because.
70. Here is a short list of some things I have wanted during my life and have gotten/achieved:
71. My favorite story to tell about myself is . . .
72. When did you go on your first airplane ride? What kind of airplane is the first you recall seeing?
73. What kind of animal are you afraid of? Why do you think you react badly to it? What do you do when you are faced with it?

Grades 7<sup>th</sup>-9<sup>th</sup>

1. The very first job I ever had was . . . I earned $XX an hour, and spent my money on . . .
2. In school, my favorite subject is . . . because . . .
3. My least favorite subject is . . . because . . .
4. My favorite New Year's Eve was in . . . That night I . . .
5. If I could choose a nickname, I would want it to be . . .
6. My favorite number is . . .
7. One of the most (peculiar, dangerous, caring, adventurous, funny, etc.) things I did in middle school was.
8. Life skills middle school might/could/should teach: understanding/accepting people who are different (sexuality, race, religion, color, etc.); social skills; manners; conflict resolution/communication skills; how to fix things; cooking; cleaning; finding a job; driving; how to play sports; self defense; "character education": caring, respect, personal responsibility.
9. Have you ever been to camp? Where did you go? What is your favorite campfire story? Camp song?
10. Who is your favorite teacher? What was your favorite class? What was your favorite school memory?
11. What are three things for which you feel really thankful?
12. If you were lost in the woods and it got dark, what would you do?
13. If you could become invisible, where would you go and what would you do?
14. What is something that really bugs you?
15. What would you do if you had a magic wand?
16. What talents do you have (don't be modest!)?
17. If you could go anyplace in the world for a vacation, where would it be?
18. Finish this sentence: The best thing about today is . . .
19. If you had to move and could take only three things with you, what would you take?
20. Write about a time when you felt very proud of yourself.
21. What makes you laugh?
22. If you could receive a sixth sense, what would you want it to be?
23. If you could be in a big parade, what would you like to do? March in a band, ride a beautiful horse, sit on a float . . .
24. Share one of the happiest days of your life.
25. What do you like most about yourself?
26. What is the most sentimental possession that you have?
27. Share a time in your life when you were embarrassed.
28. Talk about a situation that made you very irritated. How did you resolve it?
29. What is your favorite book you've read in middle school?
30. Who is your all time biggest hero?
31. Where is your favorite hideaway?
32. What do adults sometimes do that make you angry or frustrated?
33. Have you had any personal experiences with racism? Sexism?
34. What do you think about the job your parents are doing? If you could say anything to your parents about what kind of a parenting job they are doing, what would it be? Who do you know who you think is the very best parent you've met?
35. Who is the best source in your life for support and guidance? How do you know them?
36. In watching adults and peers around me, I find the following attributes to be admirable:
37. I would be so embarrassed if:
38. I spent my summer vacation:
39. I was (or was not) glad to come back to school this year because:
40. My first day back at school I:
41. I once lost a very important friend. I felt . . . I made a new friend. I like him/her because . . . My favorite thing about him/her is . . . Something I don't like about him/her is . . . My favorite things we do together are . . . Something I learned from him/her is . . . Something I taught him/her is . . .
42. I just started a new hobby/sport/activity. It is . . . I like it because . . . I do it this often . . . Some things I had to buy to do this were . . .
43. My main form of transportation is (car, but, taxi, walking, bike)
44. I got my first bike. It looked like . . . I received/bought it from . . . how I had take care of it . . . mistakes I made.
45. Do you get regular physical exercise? What physical activity do you most enjoy? How long have you been doing it? What do you like about it? What do you hate about it? How have you gotten better at it? What classes have you taken?

46. Computers are a big part of my life. My experience with computers started . . . My skill level is . . . My favorite ways to learn computers . . . My favorite websites . . . My favorite computer games are . . . My skill level at them . . .
47. My self-image: Who I think I am; who I really hope to become; who I'd like to be in my wildest dreams!
48. I would describe my "style" as:
49. The way I fit in:
50. The ways I'm special:
51. Some things I'd really like to be able to do . . . What steps I need to take to actually do those things in my lifetime . . .
52. This is what I feel/think about the (fill in adult issues) I am facing:
Issue:
53. My reaction:
54. This is how I affect my: Family . . . church . . . school . . . circle of friends . . . community . . . world.
55. I wish I could: If I had a million dollars, I would:
56. My idea of the perfect boy/girl is:
57. Here is how I feel about: My planet . . . ecology/nature . . . war/world conflict . . . religion . . . sex . . . children
58. My favorite: Person . . . activity; . . . study . . . way to relax . . . friends . . . weekend activities . . . summer activities . . . winter activities Grades $10^{th}$-$12^{th}$ 1. I was (or was not) glad to come back to school this year because:
2. My first day back at school 1:
3. How would you define joy?
4. The first time I ever drove a car was . . . The hardest part about learning to drive was . . . When I took my driving test, I felt . . . I got my license (date) . . . I remember, the first time I ever drove a car alone I felt . . . I went . . .
5. Once I got in an automobile accident: circumstances, feelings, injuries, what I learned.
6. I bought/got my first car (make, model, year) on . . . what I liked about it . . . what I didn't like about it . . . what I had to do to take care of it . . . mistakes I made . . .
7. Describe the "ideal" life:
8. Complete the statement: "A new world opened up to me when:"
9. Share a big let down in your life:
10. What makes a house a home?
11. What happened the first time you put a dent in a car? Was it your car? Or your family's car? Did you get in trouble? Could the car be fixed? Was anybody hurt because of the wreck? What did you learn from the experience?
12. If you were convinced that reincarnation was a fact, how would you like to come back?
13. How do you feel when someone laughs at you?
14. If you could take only 3 people with you on a trip around the world, whom would you take?
15. What is one of your hobbies?
16. If someone could give you anything in the world for your birthday what would you like it to be?
17. Who is your favorite teacher? What was your favorite class? What are some of your favorite school memories?
18. What is something you can do very well?
19. What does being an American mean to you?
20. Discuss one of your bad habits:
21. What is your favorite party game?
22. Describe a "good neighbor".
23. What would you do if you wanted to be a friend to someone whom could not speak English?
24. Tell what makes a happy family.
25. Write about a funny experience in a way that will make people laugh.
26. What are your favorite foods?
27. What TV or movie star would you like to invite to your birthday party?
28. What would you do if you found $1,000 in a vacant lot?
29. Tell about a time when you felt proud of yourself.
30. How do you feel about war? Do you think war is ever justified?
31. What do you think it's like after you die?
32. Sadly, many relationships with friends, boyfriends and girlfriends will come to an end over the course of your life. Writing about the situation can help you deal with your feelings. At the end of a relationship: What will you miss most about the relationship, and about the person with whom you were involved? What you will not miss? What was your role in causing the problems in the relationship or in assisting the relationship to fail? What lessons has this experience taught you? What are you sad about concerning this relationship? What you would do differently if you had it to do over again? What relationship skills do you need to develop or perfect in the future? What did you gain from the relationship? How are you richer, deeper or wiser because of the experience? What did the relationship give you that you are grateful for? What did your "ex" give you that you are grateful for? What things are you willing to forgive? What do you want to be forgiven for? What are you willing to forgive yourself for?
33. A few lessons I learned at home that I'm glad I learned include . . . I think I could have gotten along just fine without learning . . .
34. Some people who strongly influenced my life are . . . They did it—either positively or negatively by . . .
35. If I were casting someone to play me in the movie of my life, I would choose . . . because . . .
36. If I could be anybody in the world, past or present, I would choose to be . . . because . . .
37. If I were living my life as an animal, I would be . . . because . . .
38. Here's a list of important turning points in my life . . . If I were to choose one that I think altered my sense of myself; I would pick . . . because . . .
39. A recurring theme or experience in my life seems to be . . .
40. Here is a short list of some things I have wanted during my life and have gotten/achieved:
41. When people talk about sex, I feel . . . The one thing I'd like to be free to talk to someone about regarding sex is . . . Things that make me feel guilty are . . . I encountered peer pressure in this situation . . . The way I handled it was . . . Messages I have received from society about sex are: . . . and they made me feel . . . I feel they apply/don't apply to me because . . .
42. Who gave the best hugs when you were little? Did you get lots of them? Did you wish for more?
43. Do you remember a time when you helped someone with a difficult task? Why did you decide to do that?

Did it make a difference in their life? Are you glad you helped? Would you do the same thing again?

44. Do you remember being very sick as a child? What made you sick? What did you have to do about it? What did your family do to take care of you and help you get better? Did it have any lasting effects?

45. Who told the best jokes in your family? Do you remember any?

46. What luxury did you always wish you could have? Why did it seem so wonderful to you? Who did have it? Did you ever get it? Or do you think you might still get it?

47. What was the happiest letter you ever received? When and where were you when it arrived? What answer did you send? How did it change your life?

48. What do you know about the countries your relatives came from? Are you curious about them? Have you ever done any genealogy research? Have you tried to collect family data from your oldest relatives?

49. How do you define "success"? What would be the sign of a truly successful life? Do you think success will be easy to achieve? Do you have any plans in place to achieve that success?

50. What do you do when you feel zany? Do you make others laugh? Do you plan how to do that? Or does it just happen spontaneously? What is the funniest joke you ever pulled on someone? Did you ever play a prank on someone and have something bad or hurtful happen as a result? Did it change your feelings about playing jokes on people?

After the end of School Days, the next phase in a person's life is typically living on their own, so an "On My Own" volume is provided. This volume is not only a system providing an interactive journal of prompts to present questions and solicit input from the user so as to interactively build the journal or diary but also a primer of being on one's own. Links to experts and services range from finances to housework to relationships, getting the first job to furnishing one's first apartment. Advice ranges from the very practical to the more metaphysical, such as:

How do you make friends outside of the controlled atmosphere of school? How do you keep them? How do you keep in touch with the friends you are leaving behind? How do you select a roommate?

What actual steps do you need to take to make your dreams come true?

This is an especially poignant time to record a life, as the child becomes an adult and begins to learn and accept who he or she truly is. On My Own ends when the individual begins the transformation from 'me' to 'we'.

On My Own transitions a couple-oriented journal called Living Together. Living Together begins with whatever form a couple's permanent commitment takes, whether marriage or something else, and chronicles their times and "firsts" together, such as first apartment, home, vacation, etc. Links to couple counseling and other pertinent services will be provided to chronicle this important time.

Living Together segues from a couple's permanent relationship together into a family oriented journal called The Family Book. The Family Book moves through the transformation from a couple into parents, from two individuals to a family. The volume follows the family's development and encourages interaction through prompts. In accordance with this system invention an interactive website is suitably available to the user wherein the user can go to the website and access a so-called "family vault" (see vault 13 of FIG. 1) which offers virtual safety deposit boxes wherein online participants can securely and confidently keep their own journals, private information, and photos. As a community, members encourage each other using instant messaging, online chats, video chats, and e-mail. Ever-expanding technology will allow families separated by great distance to meet online around the virtual kitchen table and share dinner while they chat. Online coaching will be instantly available to the frustrated mother whose newborn won't stop crying or whose 11 year-old didn't make the all-star team, for example. Professional help can also be secured through subcontractors who can provide trained parental coaching or even serve a counseling function.

The next phase, which may be denoted On My Own, Again, is also suitably provided and enables the user to examine the time in life when many individuals whose identity has been predominantly that of parent or partner find themselves abruptly finished with that role, and face the opportunities and struggles of re-building a new life. For the first time in decades, attention moves inward. It is a time of tough questions and new decisions:

Who am I now? What do I have to offer? What makes me happy?

Interactive prompts along this line gently help with this internal examining and external rebuilding to create a record of a time rich with new understanding and possibilities, as well as providing encouragement, coaching and inspiration.

Topics in the On My Own module in a preferred embodiment include:

Moving Out and On Your Own
 1. Finding a place to five
 2. Finding a roommate

Home Maintenance and Repair
 1. Your basic tool kit
 2. Painting, basic plumbing, removing stains, mildew,
 3. How to buy, drive, and maintain a car so that it is in top shape
 4. Don't end up with a lemon: taking your time, doing your homework
 5. Buying a used car
 6. Negotiating the best loan
 7. Maximizing your car's mileage
 8. Basic self maintenance and the maintenance schedule you should try to keep
 9. Your car kit keeping you safe on the road
 10. How to change a flat tire
 11. Be a defensive driver
 12. How to find a mechanic who won't rip you off College
 1. How to choose the one that's best for you
 2. How you're going to pay for it
 3. What's your major?
 4. How to study
 5. Writing for college
 6. Higher Education Assistance—Scholarships, Grants, Work Study, etc.

Your World of Work
 1. What do you want to do with your life?
 2. Mapping out the career you want.
 3. How to make contacts in your field
 4. How to have the best job interview
 5. After you get hired how to keep the job and thrive in it
 6. Benefits to look for
 7. How to ask for a raise
 8. How to leave a job 9. Professional dress and demeanor
10. Maintaining a household Food
1. The basic, well stocked kitchen tools, gadgets, storage, staples
2. The basics of cooking preparation of staple foods (i.e., how long to boil an egg, how to cook rice and beans and vegetables and meat a primer)
3. Buying food and storing it
4. Brown bag lunches
5. First recipes and cookbooks you can't live without (recipe exchange)

Using Good Consumer Sense
1. Contracts: Getting out of a contract
2. Product warranties
3. Guarantees
4. Getting your money back
5. Small claims court Financial Fitness
1. The language of money
2. Setting up a budget
3. Calculate your net worth once a year
4. The truth about debt
5. Start investing now: the time value of money
6. Record keeping
7. Financial hardships what to do? (Which bills always get paid first, how to become a saver, how to trim your budget even further, emergency funds, how much credits cards really cost)
8. Establishing credit the right way (how does credit work, what to watch out for, your credit report, credit mistakes, what is a co signor?)
9. How to keep financial records Your Health, Diet and Well Being:
1. Learning to take care of yourself Traveling Cheap, but Well Medical Info/Referral
2. Health insurance
3. Choosing a doctor
4. Assess your health Personal Safety
1. At home
2. On the road
3. In your car
4. In the big world Relationship Building
1. The basics of communication
2. Conflict management
3. Modern courtship Buying Your First Home Advice/Coaching
1. Learn who you are personality tests/analysis
2. Conflict resolution
3. Healthy hassling
4. Making friends outside the controlled world of school
5. Sex
6. Dealing with criticism
7. Being your own person
8. Discover your values
9. Relationship counseling
10. Creating support groups
11. Developing your intuition Products/Services
1. Budget guide
2. Cookbooks
3. Housewarming kit providing the basics you need for every room in your first house!
4. Lock box
5. Custom stationary Links
1. Interest and values assessment tests to help choose your college, major and careers
2. http://www.c3apply.org/ACT CollegeNet college search engine
3. www.campustours.com
4. http://www.coUegeboard.com/SAT information and college search program
5. College home pages
6. http://www.nees.ed.gov/ipeds/cool/College Opportunities On Line (COOL) Department of Education database of 9000 U.S. colleges
7. http://www.library.uiuc.edu/edx/rankgen.htm—Illinois Library Gateway ranking college resources
8. http://iiswinprd03.petersons.com/ugchannel/Petersons Collegequest
9. http://www.review.com/Princeton Review, the student perspective on schools
10. http://www.usnews.com/usnews/edu/college/cohome.htm US News' US college rankings based on a range of criteria
11. www.betterbudgeting.com/
12. financialplan.about.com/cs/budgeting/
13. womensinvest.about.com/cs/livingsingle/
14. www.personal-budget-planning-saving-money.com/
15. www.ivillage.com/topics/relation/0,10707,196 073,00.html
16. www.singingoutloud.com/singles
17. wwmetlife.com/Applications/Corporate/WPS/CDA/PageGenerator/0,1674,P1337,00.html
18. www.hrblock.com/taxes/plannbig/lif4z events/first_job.html
19. www.monster.com
20. wwwl.umn.edu/ohr/ecep/resume/
21. www.rockportinstitute.com/resumes.html
22. anywherebutinthekitchen.com/onedinner.shtml
23. www.digsmagazine.com/nourish/nourish_cooking forone.htm
24. ohioline.osu.edu/ss-fact/0161.html
25. www.springstreet.com/apartments/mme/student/tip/first_apartment.jhtml
26. www.homestore.com/HomeGarden/Decorate/ByRoom/Apt/First.asp Sponsorship Opportunities
1. Donation agencies (Goodwill, Salvation Army, etc.), frozen foods, Monster.com, department stores, home repair, decorating and hardware stores, discount stores, chain retailers, fast food chains, restaurant chains, Public Libraries, Exemplary Prompts for the On My Own module are provided below:

College
1. What careers interest you most? Do you know someone who does that job? Try to arrange to have a conversation with that person. Take a list of questions you have.
2. Make a list of your interests and abilities
3. What activities have you explored and enjoyed?

4. What kind of college do you want to attend (small, large, liberal arts, specialized study, community college, trade school?)
5. How far do you want to be from home?

Your Life's Work
1. What is the first impression you give to other people?
2. What is your greatest strength and/or weakness?
3. What was the most important success and/or failure in you life?
4. You have just been told that you have six months to live. What would you do in that time?
5. If you suddenly won one hundred thousand dollars in the lottery, what would you do with it?
6. If you had one month and adequate funds to take a trip, where would you go? Why?
7. If you could have any kind of job, what would it be?
8. What do you plan to do when you retire? When will that be?
9. Where will you be living twenty years from now? Why?
10. What is the most adventuresome thing you have ever done?
11. What did you want to be most when you were a child?
12. What is the one thing you can do better than any other?
13. What skill do you value the most? Why?
14. Complete the following statement: I wonder . . .
15. Complete the following statement: I am proud that I . . .
16. Complete the following statement: I feel best about myself when . . .
17. Complete the following statement: Secretly I wish . . .
18. Complete the following statement: I would consider it risky . . .
19. Tell about the missed opportunity in your life you regret the most
20. What is the biggest risk you have ever taken?
21. What misconceptions do people commonly have about you?
22. Have you ever been fired? Have you ever quit a job? What did you learn from those experiences?
23. Do you find it easier to give orders than to take orders?
24. Do you consider yourself a highly competitive person?
25. Do you find it easy to work with others?
26. Do you like the work you are doing, i.e., your profession?
27. Do you like the job you have?
28. Do you find your present job fulfilling?
29. Do you feel you are fairly paid in your present position?
30. Do you enjoy a good working relationship with your boss? Subordinate? Peers?
31. Do you feel you are fairly paid in your present position?
32. Do you enjoy a good working relationship with your boss? Subordinate? Peers?

Healing You
1. What incompleteness remains left over from your past?
2. What incompleteness are you experiencing in your life right now?
3. What key that would unlock the puzzle in your life?
4. How do you avoid feeling and expressing your feelings?
5. What do you see as the first step in your healing process? What actions do you need to take this step?
6. How do you sabotage yourself?
7. What parts of yourself do you disown?
8. How do you nurture yourself?
9. How could you do that better?
10. What self doubts do you struggle with? Why?
11. What might be the result of forgiving yourself?
12. What parts of yourself do you really like?
13. What parts do you want to grow and expand?
14. What feelings do you have that you don't allow yourself to express?
15. What remains unlived about your life?
16. Who and what are most precious to you?
17. What losses both great and small have you experienced?
18. Do you ever catch yourself withdrawing from your surroundings and not relating as a result? Expand on that.
19. What have you ever done to successfully reverse that process?
20. Do you have unfinished business in your life?
21. How do you manifest your self image?
22. How have your attempts to "keep it together" and maintain control in your life intensified your pain? Do you see places in your life where you do not have control?
23. How can you become more alive?
24. What is the heart of the problem you are struggling with?
25. What are some things you truly long for?
26. What would it take to rip down your armor?
27. What has been the scariest thing that bas happened to you in intimacy? Did it cause you to close yourself off from future intimacy?
28. What does living well mean to you? Are you living well? Can you love well?
29. Where do you turn for wisdom?
30. Are you holding on to shame?
31. Is your life different from how you thought it would be when you were a kid? How is it different?
32. How can you have more fun?.Do you want to?
33. What do you want from life that you don't currently have? What are some real steps you might take to get it?
34. How do you express yourself spiritually? Are you happy with that? Would you like to become more spiritual?
35. What is it time for right now in your life?

The family book includes facilities whereby families and groups can record their stories and experiences for the benefit of other family members, future generations, friends and associates. Even the most mundane and seemingly trivial bits of information become a treasure when they pass down the line to future generations.

Examples in the family book include topics of:
1. And Two Become One . . .
2. And Baby Makes Three . . .
3. We Are A Family
4. Our Family Traditions ADVICE/COACHING related to this includes:
1. Good books to read
2. Family decorating techniques
3. Building holiday traditions
4. Framing family pictures
5. Making memories
6. Dates to remember 7. Family real estate
8. Family medical histories Prompts for the Family Book include:

Getting to Know Your One and only
1. On our first date, we . . .
2. As I saw more of you, what really made me fall in love was . . .
3. I knew that you just might be the one when . . .
4. An obstacle in the path of our romance early on was . . .
5. Our families were different and similar in these ways . . .
6. A special intimate moment or time was when . . .
7. The first time I met your family . . .
8. The first time you met my family . . .
9. Here's what family and fiends had to say about us as we became a couple . . .
10. When we were apart, we stayed in touch by . . .
11. These things symbolized our growing love (special song, place, poem, etc.) . . .
12. We shared this vision for the future . . .
13. Special pre marriage milestones I remember are (first meeting, fast date, first kiss, etc.)
14. We had these differences to work out . . .
15. Some of the things we both believed in were . . .
16. Our romance almost broke up when . . .

Tying the Knot
1. The cast of wedding party members, and why they were chosen, included . . .
2. The wedding location, and why it was chosen, was . . .
3. What everyone wore . . .
4. Our colors and theme:
5. Our cake:
6. What we ate and drank . . .

Starting Out Together
1. This challenged our relationship:
2. We bought our first home . . .
3. How we went about combining our belongings . . .
4. This is how our finances were set up early on . . .
5. Living together taught us these new things about each other and our habits . . .
6. We started talking about having children . . .
7. Having children changed our relationship in these ways . . .
8. These are some ways we took care of each other . . .
9. Special nicknames we had for each other . . .

The Middle Years
1. A memorable hobby or project we worked on together was . . .
2. What we liked to do to relax together . . .
3. A memorable party we gave or attended . . .
4. Our relationship evolved over the years in this way . . .
5. A very sad time for us was when . . .

The Later Years
1. When our children became adults, it changed our lives as a couple by . . .
2. After we retired, we had more time to . . .
3. We traveled to these places . . .
4. After all these years, I learned this new aspect about you . . .
5. The hard part of our relationship was . . .
6. These are the reasons I am thankful for you . . .
7. As our bodies grow older, this is how it affected our relationship (hearing loss, etc.)
8. We mourned the loss of this dear person/people together . . .
9. A lesson or two about marriage I'd like to share with the next generation is . . .
10. This is a story I love to tell about us to others . . .

Family Backgrounds
1. From where did your ancestors emigrate?
2. How did they get here?
3. Where did they settle, and why?
4. What do you remember about your oldest relative you knew personally?
5. What do you know about your family's values, philosophies and religious beliefs?
6. What memories do you have of your mother during your childhood?
7. What memories do you have of your father during your childhood?
8. What is the happiest memory that you have of your childhood?
9. What is the most painful memory from your childhood?
10. What are the most important things you learned growing up?

Childhood
1. Was there anything unusual about your birth?
2. Do you know why you were given your name, and does it have a special meaning?
3. What was your birth order among your siblings?
4. What were you like as a child?
5. Describe the homes and neighborhoods in which you grew up.
6. Describe your family's economic conditions, and the other factors that affected your lifestyle.
7. Tell about your other siblings, and your relationships with each of them.
8. What memories do you have about school?
9. What were the genetic, hereditary and primary health issues in your family?
10. What serious accidents occurred within your family?
11. What were your greatest fears, when you were a child and at present?
12. Who influenced you most in your childhood?
13. Share your funniest memory from childhood?

The Teen Years
1. List your best friends. Give a thorough description of each of them.
2. What were some of the fads when you were a teen?
3. What did you like best and least about your appearance during these years?
4. What slang expressions were popular?
5. Describe your relationship with your parents during your teens . . . Who did you turn to for advice?
6. What was your greatest accomplishment as a teenager?
7. What was your greatest fear?
8. Whom did you admire most, and why?
9. Tell a story about something funny and embarrassing that happened to you.
10. Did you have a nickname? What was it and how did you get it?
11. What was the most historic event that took place, and how did it affect you as a teenager?
12. When you moved away from home, where did you go?

13. Did you go to college? Where? Why did you choose it? What did you study? Did you earn a degree?

Military Service
1. Did you enlist into the military, or were you drafted?
2. What branch did you serve in?
3. Where did you take basic training?
4. What was basic training like for you?
5. Where were you stationed, and for how long?
6. What was your specialty?
7. Were you ever in combat? If so, describe some of your experiences.
8. What did you do for rest and relaxation?
9. Did you win any medals or decorations, and for what?
10. What was it like for you when the war ended, or when you left the service?
11. Altogether, how long did you serve, and what was the highest rank you obtained?
12. What are your most painful memories of the military?

Independence, Work and Career
1. Write about the jobs you've had, and what you're doing now.
2. What was your very first job?
3. What were your dreams and goals during your first years of independence?
4. Do you have any interesting work related stories to tell?
5. What has been your motivation to achieve or succeed in your career?
6. How did your level of education influence your career?
7. Tell about the high/low points in your career.
8. What accomplishments in your career make you proudest?

Personal Family Profiles
Father
1. Brothers and sisters
2. Their names and nicknames
3. Whom they were named for
4. Their good and bad sides
5. Their hobbies
6. What they do for work Good Times and Bad
1. I got my first pet . . .
2. I was in a contest . . .
3. I was in a play . . .
4. I learned to dance . . .
5. I had my first date . . .
6. I had chicken pox . . .
7. I had my tonsils out . . .
8. I broke my . . .

When I Look Back, I Have to Laugh
1. The silliest thing I ever did . . .
2. The dumbest thing I ever did . . .
3. The smartest thing I ever did . . .

The Best
1. The best vacation I ever had growing up . . .
2. The best year I enjoyed in school . . .
3. The best car we ever owned . . .
4. My first, best sweetheart until I was 10 . . .
5. My next, best sweetheart until I was 20 . . .
6. My best, best sweetheart since . . .

Favorites in My Memory
1. My favorite color . . .
2. My favorite food . . .
3. My favorite animal . . .
4. My favorite after shave . . .
5. My favorite season . . .
6. My favorite day of the year . . .
7. My favorite time of the day . . .
8. My favorite musical instrument . . .
9. My favorite song . . .
10. Some of my best friends before I was 10 . . .
11. Some of my best friends as a young man . . .
12. Some of my best friends for life . . .
13. The happiest holiday that I remember as a child . . .
14. The happiest holiday that I remember in my teens . . .
15. The happiest holiday that I remember all grown up . . .
16. The holiday I would rather forget . . .

The United States of America
1. Places I have visited . . .
2. Places I have always wanted to visit . . .
3. Places I never want to visit . . .

My Best Advice to My Children/Grandchildren

Good Deeds
1. The three nicest good deeds others have done for me . . .
2. The three nicest good deeds I have tried to do for others . . .
1. The one time in my life I would most like to live over as a child
2. The one time in my life I would most like to live over as a teen
3. The one time in my life I would most like to live over as an adult
1. The one time in my life I would most like to live over as a child
2. The one time in my life I would most like to live over as a teen
3. The one time in my life I would most like to live over as a adult A Father's Final Footnotes
Personal Family Profiles
Mother
1. Brothers and sisters
2. Their names and nicknames
3. Whom they were named for
4. Their good and bad sides
5. Their hobbies
6. What they do for work Good Times and Bad
1. I got my first pet . . .
2. I was in a contest . . .
3. I was in a play . . .
4. I learned to dance . . .
5. I had my first date . . .
6. I had chicken pox . . .
7. I had my tonsils out . . .
8. I broke my . . .

When I Look Back, I Have to Laugh
1. The silliest thing I ever did . . .
2. The dumbest thing I ever did . . .
3. The smartest thing I ever did . . .

The Best
1. The best vacation I ever had growing up . . .
2. The best year I enjoyed in school . . .
3. The best car we ever owned . . .
4. My first, best sweetheart until I was 10 . . .

5. My next, best sweetheart until I was 20 . . .
  6. My best, best sweetheart since . . .

Favorites in My Memory
  1. My favorite color . . .
  2. My favorite food . . .
  3. My favorite animal . . .
  4. My favorite perfume . . .
  5. My favorite season . . .
  6. My favorite day of the year . . .
  7. My favorite time of the day . . .
  8. My favorite musical instrument . . .
  9. My favorite song . . .
  10. Some of my best friends before I was 10 . . .
  11. Some of my best friends as a young woman . . .
  12. Some of my best friends for life . . .
  13. The happiest holiday that I remember as a child . . .
  14. The happiest holiday that I remember in my teens . . .
  15. The happiest holiday that I remember all grown up . . .
  16. The holiday I would rather forget . . .

The United States of America
  1. Places I have visited . . .
  2. Places I have always wanted to visit . . .
  3. Places I never want to visit . . .

My Best Advice to Whom It May Concern: My Children/Grandchildren

Good Deeds
  1. The three nicest good deeds others have done for me . . .
  2. The three nicest good deeds I have tried to do for others . . .
  1. The one time in my life I would most like to live over as a child
  2. The one time in my life I would most like to live over as a teen
  3. The one time in my life I would most like to live over as an adult
  1. The one time in my life I would most like to live over as a child
  2. The one time in my life I would most like to live over as a teen
  3. The one time in my life I would most like to live over as a adult Mother has the Last Word
  Personal Family Profiles
  Brother
    1. Brothers and sisters
    2. Their names and nicknames
    3. Whom they were named for
    4. Their good and bad sides
    5. Their hobbies
    6. What they do for work Good Times and Bad
  1. I got my first pet . . .
  2. I was in a contest . . .
  3. I was in a play . . .
  4. I learned to dance . . .
  5. I had my first date . . .
  6. I had chicken pox . . .
  7. I had my tonsils out . . .
  8. I broke my . . .

When I Look Back, I Have to Laugh
  1. The silliest thing I ever did . . .
  2. The dumbest thing I ever did . . .
  3. The smartest thing I ever did . . .

The Best
  1. The best vacation I ever had growing up . . .
  2. The best year I enjoyed in school . . .
  3. The best car we ever owned . . .
  4. My first, best sweetheart until I was 10 . . .
  5. My next, best sweetheart until I was 20 . . .
  6. My best, best sweetheart since . . .

Favorites in My Memory
  1. My favorite color . . .
  2. My favorite food . . .
  3. My favorite animal . . .
  4. My favorite after shave . . .
  5. My favorite season . . .
  6. My favorite day of the year . . .
  7. My favorite time of the day . . .
  8. My favorite musical instrument . . .
  9. My favorite song . . .
  10. Some of my best friends before I was 10 . . .
  11. Some of my best friends as a young man . . .
  12. Some of my best friends for life . . .
  13. The happiest holiday that I remember as a child . . .
  14. The happiest holiday that I remember in my teens . . .
  15. The happiest holiday that I remember all grown up . . .
  16. The holiday I would rather forget . . .

The United States of America
  1. Places I have visited . . .
  2. Places I have always wanted to visit . . .
  3. Places I never want to visit . . .

Good Deeds
  1. The three nicest good deeds others have done for me . . .
  2. The three nicest good deeds I have tried to do for others . . .
  1. The one time in my life I would most like to live over as a child
  2. The one time in my life I would most like to live over as a teen
  3. The one time in my life I would most like to live over as an adult
  1. The one time in my life I would most like to live over as a child
  2. The one time in my life I would most like to live over as a teen
  3. The one time in my life I would most like to live over as a adult
  Personal Family Profiles
  Sister Brothers and Sisters
  1. Their names and nicknames
  2. Whom they were named for
  3. Their good and bad sides
  4. Their hobbies
  5. What they do for work Good Times and Bad
  1. I got my first pet . . .
  2. I was in a contest . . .
  3. I was in a play . . .
  4. I learned to dance . . .

5. I had my first date . . .
6. I had chicken pox . . .
7. I had my tonsils out . . .
8. I broke my . . .

When I Look Back, I Have to Laugh
1. The silliest thing I ever did . . .
2. The dumbest thing I ever did . . .
3. The smartest thing I ever did . . .

The Best
1. The best vacation I ever had growing up . . .
2. The best year I enjoyed in school . . .
3. The best car we ever owned . . .
4. My first, best sweetheart until I was 10 . . .
5. My next, best sweetheart until I was 20 . . .
6. My best, best sweetheart since . . .

Favorites in My Memory
1. My favorite color . . .
2. My favorite food . . .
3. My favorite animal . . .
4. My favorite after shave . . .
5. My favorite season . . .
6. My favorite day of the year . . .
7. My favorite time of the day . . .
8. My favorite musical instrument . . .
9. My favorite song . . .
10. Some of my best friends before I was 10 . . .
11. Some of my best friends as a young man . . .
12. Some of my best friends for life . . .
13. The happiest holiday that I remember as a child . . .
14. The happiest holiday that I remember in my teens . . .
15. The happiest holiday that I remember all grown up . . .
16. The holiday I would rather forget . . .

The United States of America
1. Places I have visited . . .
2. Places I have always wanted to visit . . .
3. Places I never want to visit . . .

Good Deeds
1. The three nicest good deeds others have done for me . . .
2. The three nicest good deeds I have tried to do for others . . .
1. The one time in my life I would most like to live over as a child
2. The one time in my life I would most like to live over as a teen
3. The one time in my life I would most like to live over as an adult
1. The one time in my life I would most like to live over as a child
2. The one time in my life I would most like to live over as a teen
3. The one time in my life I would most like to live over as a adult After the On My Own Again/Family phase, a volume directed towards the end of life, called Before I Go, is provided. This last book in the series takes a person through the natural order of aging and coming to grips with the end of his or her existence here. Foremost, it is a chance to try to encapsulate and pass on the accumulation of wisdom and understanding of an entire lifetime, to let it live past the end of that life and be carried on to successive generations. Questions and prompts are designed to lead individuals to a passage of peace, with the knowledge that they took care of the loose ends and unfinished business and told their story as best they could. This volume is suitably constructed so that it is appropriate for and works as well for those who face dying prematurely as for those whose life has been long.

A lifetime is full of events, tragedies, passions, achievements and adventures, but so often our parents, grandfathers, grandmothers, and all manner of kin leave this world without sharing many of their stories with us either verbally or in writing. This book is designed to prompt an individual to reveal their inner self to their loved ones by telling important life stories of their beginnings, bits and pieces of growing up, adventures of adult achievements and so much more. These prompts not only provide a written legacy for the next generation, but also the opportunity for transcendence in the release of painful memories and the experience of forgiveness and mercy.

Topic Areas for Before I Go

Vital Statistics
1. Birth date, birth place, marriage(s), divorce(s), children born to you Family Tree
1. From as far in the past as possible, to the present day (preferably including as many portraits you can collect)

Cultural Heritage/Ethnic Background Information
1. Place of origin for as many relatives as you can ascertain, history of passage from the old country to the new, collected customs and practices kept alive within your family Personal History
1. Story of your birth
2. Childhood stories
3. Education
4. Religion
5. Significant relationships in my lifetime
6. Grandchildren
7. Great grandchildren
8. Places I lived during my lifetime (pictures):
9. Places I have traveled (pictures, stories, years):
10. Things I always wanted to do and did:
11. Things I always wanted to do and wish I had done:
12. Events and experiences that made my life happy:
13. My true loves
14. My greatest achievements:
15. Things I most wanted to achieve, and did not:
16. My proudest moments:
17. My moments of deepest humility:
18. I want to thank for . . .
19. I want to vent at for . . .
20. My feelings about death and dying are . . .
21. Bits of wisdom I wish to share:
22. Important books I read:
23. Music I loved:
24. Favorite quotes:
25. Favorite: colors, foods, smells, sounds, tactile feelings, visual experiences, movies, songs, cars, piece of furniture, books, objects, pets, people, friends, truths
26. Describe some of your most precious possessions:
27. Life changing events I want to share:
28. When I was young, we did this way, and now it is done this way.

29. Advances' in technologies during my lifetime
30. My last picture before I leave:
31. Spiritual beliefs/thoughts/adventures during my life: what I have believed in the past, and what I believe now
32. Jobs I held during my lifetime:
33. My very favorite jobs:
34. Jobs I have hated:
35. Retirement experiences:
36. Wild stories and things I did that might be hard to believe:
37. Traumatic events and stories I have rarely shared:
38. My wishes for my body after death . . .
39. My desires regarding memorials or services after my passing . . .
40. Living will/legal issues/my lawyer:

To Be Read and Opened After My Passing:
  1. My final thoughts (to include: amends, confessions, letters to relatives/friends, love stories, legal will and testament, painful stories, etc).

Advice/Coaching
  1. Connections to people experiencing a similar end to their lives
  2. Death and dying counseling
  3. Help dealing with family members as your life winds down
  4. Remembering to take care of yourself during this time
  5. Remembering that you and all significant people in your lives are a part of this event
  6. Medical advice to ease pain and maximize comfort Products/Services
  1. Storage boxes and durable envelopes to hold valuable papers, letters, and objects destined to pass on to someone after death.
  2. Custom death announcements that can be completely personalized to your situation Links
  1. Hospice Foundation
  2. Funeral Consumer's Alliance
  3. Alzheimer's Foundation
  4. Writing your obituary Inserts
  1. Premature illness and death In addition to the above volumes or journals, other optional sections are also suitably provided. One such volume, Book of Days, serves as a companion piece to help manage time and keep track of goals and projects. This electronic book includes a family calendar, address book, concise daily journal, daily schedule, bulletin board for notes, and reminder service. Information can be downloaded into hard copy. Users can store virtual copies of important documents in the electronic safety deposit boxes. By linking to a central database, certain information can be automatically updated, for instance contact information for old friends. Services may be offered to help old friends stay in touch, in groupings ranging from two people to a large segment of one's graduating class, for instance, or to aid in finding new friends or romantic interests in a new and unfamiliar city.

In addition to the Book of Days, the system also provides other "inserts" focusing on the areas of adoption, death and divorce, since not all lives neatly follow the regular structured pattern described thus far. These areas are to be developed by knowledgeable professionals and by people who have lived through the particular experiences. Each of the segments has tie-ins in a number of areas. Ancillary products can be offered, such as templates for scrapbooking and so on, boxes, time capsules, hope chests and other tangible places to hold treasures and memory-laden objects, informative books about how to deal with some of the challenges particular to each segment, and others that can be created as markets seem open to them.

Each book described above includes areas that address life's most joyous moments as well as its most difficult passages, for example the course of receiving a child during adoption, the heartbreak and process of divorce, the poignancy of watching a parent become fragile, and vast other elements that affect one's life. The system is designed to operate via online interaction with users, but can alternately be downloaded into a hard copy version of each user's own design, created from resources available as part of the online system. These include scrap book and manuscript templates, as specific examples.

Users can have videos available on member websites, for example, where a family can have video to be viewed by distant family members or friends, showing a child's performance, family event, sports games, etc.

Each member is able to keep a personal journal under "lock and key" so that access is restricted.

Different levels of service are available, with varying storage amounts or services (e.g., still picture presentation and storage might be provided at one level, while video storage and access might be provided at another). Scrapbook templates, book publishing tools, borders, designs, boxes, family totem boxes and the like may be provided. The book publishing tools provided enable the user to easily turn their writings into a book form, for publication, for example. The electronic safety deposit box concept can allow storage of important papers, which are then easily accessed from anywhere. Living wills can be stored, for example. The system can provide, in the book of days, for example, an index of keywords or dates, and links to the particular entries related thereto, of the person's entries.

The various volumes or books can cover age ranges in a preferred embodiment as follows:
  The Great Event, conception to 7 years old
  School Days—kindergarten through high school
    subdivisions thereon:
      age 5 through 11 (grades K-6)
      age 11-13 (grades 6-8)
      age 13-17 (high school)
  On my Own—18 years and beyond, up to the point where the commitment to another book (I to We) would take over
  The Family Book (various age ranges of adults)
  On my Own Again (after children move away, or divorce or other separation occurs)
  Also, a "Book of Days" may be provided which includes a calendar, address book, personal history, footnotes, daily journal, reminders, notes and the like.

Thus, in accordance with the invention, an interactive journal/diary system is provided, which includes life coaching or advice capabilities. Products and services appropriate to a stage of life or particular issue in the user's life can be suitably presented to the user, and may be provided through the system. Products and services simultaneously pertinent to multiple generations, such as life insurance or photographic film, may also be offered. Journaling storage boxes, which may comprise shoe-box or cigar box size storage containers up to hope chests or the like, may also be provided and offered as an add on product for sale to users, for storing personal items or collectibles that have meaning to the user. By providing the association with specific products and service providers that are appropriate and which may be timely and desirable to a user of the journal system, a more useful journal is created that provides not only a place to store thoughts and memories, but also a place to go to in order to seek guidance and needed information and products at a specific time in a user's life.

The overall system can be sold as a stand alone software product, in separate modules or volumes or as an entire set. Alternatively, access is provided on a subscription or membership basis, whether by selling use time increments, or by the day/month/year, etc.

Products and benefits and services that can be associated with and incorporated into the system include: coaching, diaper service, doctor referral, on-line support groups, medical information and referral, classified ads, name banks (random name generators (for naming children or pets, for example)), furniture manufacturing, collecting box mementos, photo and video posting, message centers, calendars, announcements, party supplies, rituals, big brother/big sister programs, latest scientific research, year you were born, sponsors, community buildings, online interaction and archiving, online support, professional help and support, sponsorship partners, corporations, volunteers, organizations, list serves, garage sales, block parties, neighborhood watches, neighborhood moderators, classmates, alumni associations, Corporate sponsors for different sections, coupons, Product rating, No identifying data collection, Music—archivist, Photo collection, Advising center for School Days, Job finding for On My Own and On My Own Again, Genealogy links, Higher education assistance scholarships, info., Vacation planning for Book of Days/family financial advice from corporate sponsors, On My Own budgeting, On My Own Again retirement Planning, Family Book college fund assistance, workshops on use of the journaling system (hints, tips, ideas), Medical info/referral/supply, Clothing manufacturers, Furniture manufacturing, Party supplies, Latest scientific research health/will, Dieting/diet, Calendar, Secure age appropriate chat rooms, Training/skill/relationship building, Life Time phonebook to forever keep in touch, One line Zines, Contests, Mentoring/peer training, College/vacation prep, Personal bulletin boards, Central/virtual message center, Virtual family/friend get togethers, Holidays, meals, special occasions, graduations, birthdays, family reunions, email, Holiday ordering of gifts special prices, Hope chests, Photo album, Souvenir/scrap books, Frames, Great Event specifics, Name book, Time capsule, On line birth support for mom and dad, Diaper service, Dr. Referrals, Medical info and referral (for all books), Birth announcements, Ritual contracts (for all books), Big brother/sister advice/info, Family book specifics, Family calendar, Birthdays, anniversaries, recitals, graduation, Photo/video Gallery, Central messaging center—accessible by voice mail, Homework/tutoring/research help, Cool school nominations and contests, Student exchange Annotate memories when saving, Real-time memory exchange-baby pictures Birth broadcasts Real-time (parent to kid—we have to talk about this bill and show the bill after scanned) Discussion—groups Birth announcements Wedding albums Exchange of vows Special events celebrations, Real-time memory search of journal/prompt responses, "The perfect memory" internal journal/prompt response search, for example.

The system can suitably be implemented as an add on content or subscription option for internet providers While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. An interactive life time journal system, comprising:
   an information database store for keeping user journal data;
   an interface for prompting the user for collecting the user's life history, ideas, and stories according to a selected list of questions, wherein the answers to the selected list of questions generate content for storage according to a selected template to generate associated memory content;
   at least one link to at least one other user; and
   a central database for storing contact information of the user and the other user, adapted so that each of the user and the other user can update their own contact information and access the other's contact information.

* * * * *